United States Patent
Liu et al.

(10) Patent No.: US 9,710,167 B2
(45) Date of Patent: Jul. 18, 2017

(54) DIRECT NON-VOLATILE CACHE ACCESS ACROSS DEVICES

(71) Applicant: ScaleFlux, San Jose, CA (US)

(72) Inventors: Yang Liu, Milpitas, CA (US); Hao Zhong, Los Gatos, CA (US); Fei Sun, Irvine, CA (US); Tong Zhang, Watervilet, NY (US)

(73) Assignee: ScaleFlux, San Jose, CA (US)

( * ) Notice: Subject to any disclaimer, the term of this patent is extended or adjusted under 35 U.S.C. 154(b) by 50 days.

(21) Appl. No.: 14/919,344

(22) Filed: Oct. 21, 2015

(65) Prior Publication Data

US 2016/0124643 A1    May 5, 2016

Related U.S. Application Data

(60) Provisional application No. 62/072,969, filed on Oct. 30, 2014.

(51) Int. Cl.
| | |
|---|---|
| G06F 3/06 | (2006.01) |
| G06F 12/0877 | (2016.01) |
| G06F 13/28 | (2006.01) |
| G06F 13/42 | (2006.01) |
| G06F 12/0868 | (2016.01) |
| G06F 12/0873 | (2016.01) |

(52) U.S. Cl.
CPC ............ *G06F 3/061* (2013.01); *G06F 3/0647* (2013.01); *G06F 3/0683* (2013.01); *G06F 12/0868* (2013.01); *G06F 12/0873* (2013.01); *G06F 12/0877* (2013.01); *G06F 13/28* (2013.01); *G06F 13/4282* (2013.01); *G06F 2212/1016* (2013.01); *G06F 2212/222* (2013.01); *G06F 2212/314* (2013.01)

(58) Field of Classification Search
CPC ...... G06F 12/0868; G06F 3/061; G06F 13/28; G06F 2212/222; G06F 3/0647; G06F 2212/314; G06F 12/0877; G06F 13/4282; G06F 2212/1016; G06F 3/0683; G06F 12/0873

See application file for complete search history.

(56) References Cited

U.S. PATENT DOCUMENTS

| | | | | |
|---|---|---|---|---|
| 2013/0339587 A1* | 12/2013 | Asnaashari | ......... | G06F 12/0246 711/103 |
| 2015/0169223 A1* | 6/2015 | Srikantaiah | ......... | G06F 12/1081 711/147 |
| 2016/0062424 A1* | 3/2016 | Thomas | .................... | G06F 1/24 710/313 |

\* cited by examiner

*Primary Examiner* — Hashem Farrokh (74) *Attorney, Agent, or Firm* — Hoffman Warnick LLC (57) ABSTRACT

A system and method of providing direct data access between a non-volatile cache and a set of storage devices in a computing system. A system is disclosed that includes: a processing core embedded in a controller card that controls a non-volatile cache system; and a direct access manager for directing the processing core, wherein the direct access manager includes: a switch configuration system that includes logic to control a switch for either a direct access mode or a CPU access mode, wherein the switch couples each of the storage devices, a local bus, and the non-volatile cache system; a command output system that includes logic to output data transfer commands; and a data transfer system that includes logic to manage the flow of data directly between the non-volatile memory and the set of storage devices; and an arbitrator that arbitrates data traffic flow through the switch.

19 Claims, 7 Drawing Sheets

DIRECT NON-VOLATILE CACHE ACCESS ACROSS DEVICES

PRIORITY CLAIM

This application claims priority to U.S. Provisional Patent Application Ser. No. 62/072,969, filed Oct. 30, 2014, which is hereby incorporated herein as though fully set forth.

TECHNICAL FIELD

The present invention relates to the field of storage system and particularly to providing data transmission when cache and multiple storage devices are used.

BACKGROUND

In computing, cache is a component that transparently stores data so that future requests for that data can be served faster. A non-volatile cache is a cache that can persistently store the data even when not being powered. Non-volatile cache can provide thousands times of more storage space than normal local memories embedded in a central processing unit (CPU), thus allowing the CPU to quickly serve large amounts of temporarily stored data. However, one limitation of non-volatile cache is that it shares the same data bus as other block storage devices in a computer system. Accordingly, moving data from traditional storage devices to a non-volatile cache is limited by the constraints of the shared data bus.

SUMMARY

Aspects of the present disclosure are directed to an infrastructure for providing direct non-volatile cache access from other storage devices. One solution includes exposing non-volatile cache space to other storage devices; arbitrating the incoming requests between direct memory access (DMA) and direct non-volatile cache access across devices.

In a first aspect, the invention provides a system for providing direct data access between a non-volatile cache and a set of storage devices in a computing system, comprising: a processing core embedded in a controller card that controls a non-volatile cache system; and a direct access manager for directing the processing core, wherein the direct access manager includes: a switch configuration system that includes logic to control a switch for either a direct access mode or a CPU access mode, wherein the switch couples each of the storage devices, a local bus, and the non-volatile cache system; a command processing system that includes logic to process data transfer commands; and a data transfer system that includes logic to manage the flow of data directly between the non-volatile cache and the set of storage devices.

In a second aspect, the invention provides a computing system, comprising: a CPU having a local memory and a PCIe root complex; a bus that couples the CPU to a PCIe switch; a set of storage devices and a non-volatile cache coupled to the PCIe switch; a direct access PCIe controller card coupled to the non-volatile cache that provides direct data access between the non-volatile cache and the set of storage devices, wherein the direct access PCIe controller card includes: a processing core; a direct access manager for controlling the processing core, wherein the direct access manager includes: a switch configuration system that includes logic to control the PCIe switch between a direct access mode and a CPU access mode; a command output system that includes logic to output data transfer commands; and a data transfer system that includes logic to manage the flow of data directly between the non-volatile cache and the set of storage devices; and an arbitrator that schedules data traffic flow through the PCIe switch.

In a third aspect, the invention provides a method of providing direct data access between a non-volatile cache system and a set of storage devices in a computing system, wherein the computing system further includes a CPU, CPU local memory, a root complex and a switch, the method comprising: providing a controller that is coupled to and controls a non-volatile cache system; receiving at the controller a command from the CPU to transfer data between the non-volatile cache system and a storage device; generating and sending a command from the controller to configure the switch to allow a direct data transfer between the non-volatile cache system and the storage device; generating and sending a data transfer command from the controller to the storage device; and implementing the data transfer directly through the switch between the non-volatile cache system and the storage device.

BRIEF DESCRIPTION OF THE DRAWINGS

The numerous advantages of the present invention may be better understood by those skilled in the art by reference to the accompanying figures in which.

Reference will now be made in detail to the presently preferred embodiments of the invention, examples of which are illustrated in the accompanying drawings.

DETAILED DESCRIPTION

Figure 1:
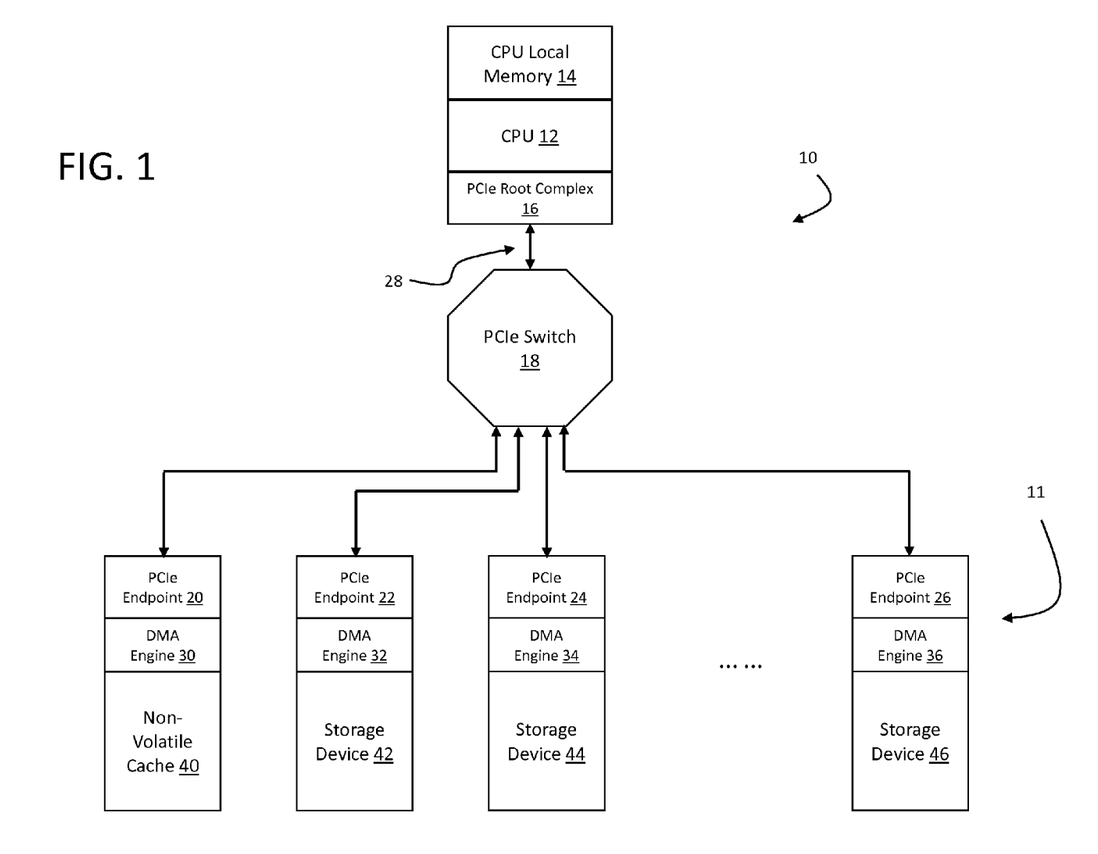
FIG. 1 is a block diagram illustrating connection of CPU, memory, non-volatile cache, and storage devices in a computer system.

FIG. 1 depicts a computing system 10 having a storage architecture, such as that used in data centers and other facilities to store and manage data, using PCI Express (PCIe) technology. Unlike shared parallel bus architectures, PCIe is based on a point-to-point topology in which separate serial links connect every device to the root complex 16 (i.e., host). Accordingly, a PCIe bus link supports full-duplex communication between any two endpoints, with no inherent limitation on concurrent access across multiple endpoints. PCIe endpoints 20, 22, 24, 26 are typically implemented as cards that plug into an associated device. Root complex 16 connects the CPU 12 and CPU local memory 14 to the PCIe switch fabric composed of one or more switches 18.

The PCIe root complex 16 generates transaction requests on behalf of the CPU 12, which is interconnected through a local bus 28. Root complex 16 functionality may be implemented as a discrete device, or may be integrated with the CPU 12. A root complex 16 may contain more than one PCIe port and multiple switches 18 can be connected to ports on the root complex 16 or cascaded.

As shown, CPU 12 accesses its local memory 14 through exclusive local bus 28. Non-volatile cache 40 and other storage devices 42, 44, 46 are accessible through a shared bus to CPU 12. Each non-volatile cache or storage device has a PCIe endpoint 20, 22, 24, 26 (or endpoint controller). These PCIe endpoints are connected to a PCIe switch 18 that connects to the PCIe root complex 16 in CPU 12. PCIe switch 18 can be expended by connecting to other PCIe switches.

Figure 2:
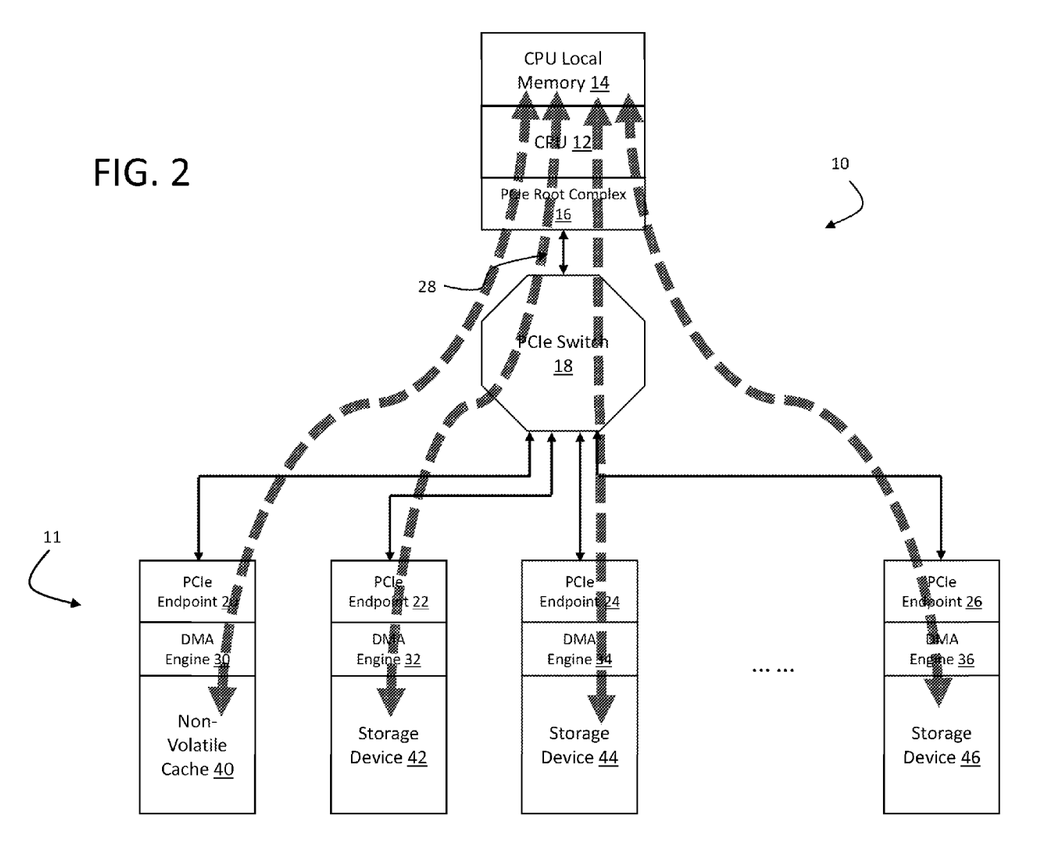
FIG. 2 is a block diagram illustrating data flows between CPU, memory, non-volatile cache, and storage devices in a computer system.

In order to offload CPU 12 workload, a DMA engine 30, 32, 34, 36 is implemented in each non-volatile cache 40 and other storage devices 42, 44, 46. The DMA engine 30 initiates PCIe transactions to read data from or write data to CPU local memory 14, as shown by the large arrows in FIG. 2. Accordingly, all data movements must go through the PCIe switch 18 and aggregate to the PCIe root complex 16, CPU 12, and CPU local memory 14. The bandwidth of the PCIe root complex 16 and CPU local memory 14 are not scalable and thus become a bottleneck of data transmission as the number of storage devices 11 continues to increase. Thus, in traditional systems shown in FIGS. 1-2, when data from a storage device 42, 44, 46 is to be read into the non-volatile cache 40, it must passed from a storage device, through the local bus 28 and CPU local memory 14 and then to the non-volatile cache 40.

Figure 3:
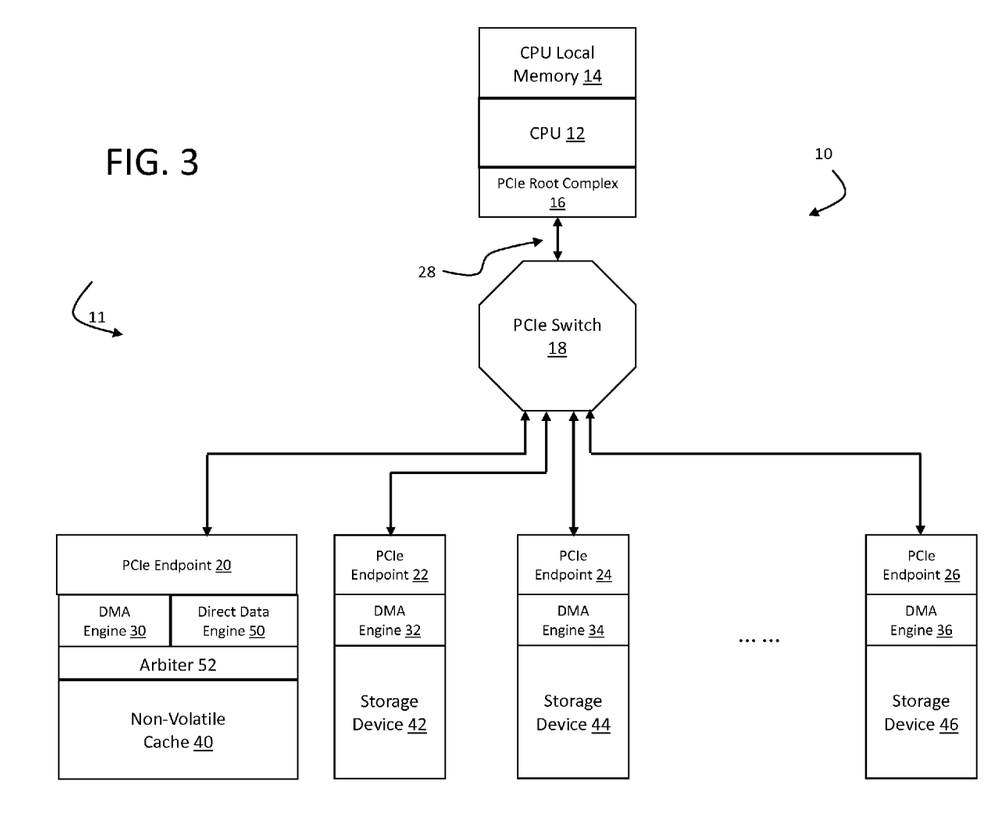
FIG. 3 is a block diagram illustrating connection of CPU, memory, non-volatile cache with direct access support, and storage devices in a computer system according to embodiments of the present invention.
Figure 4:
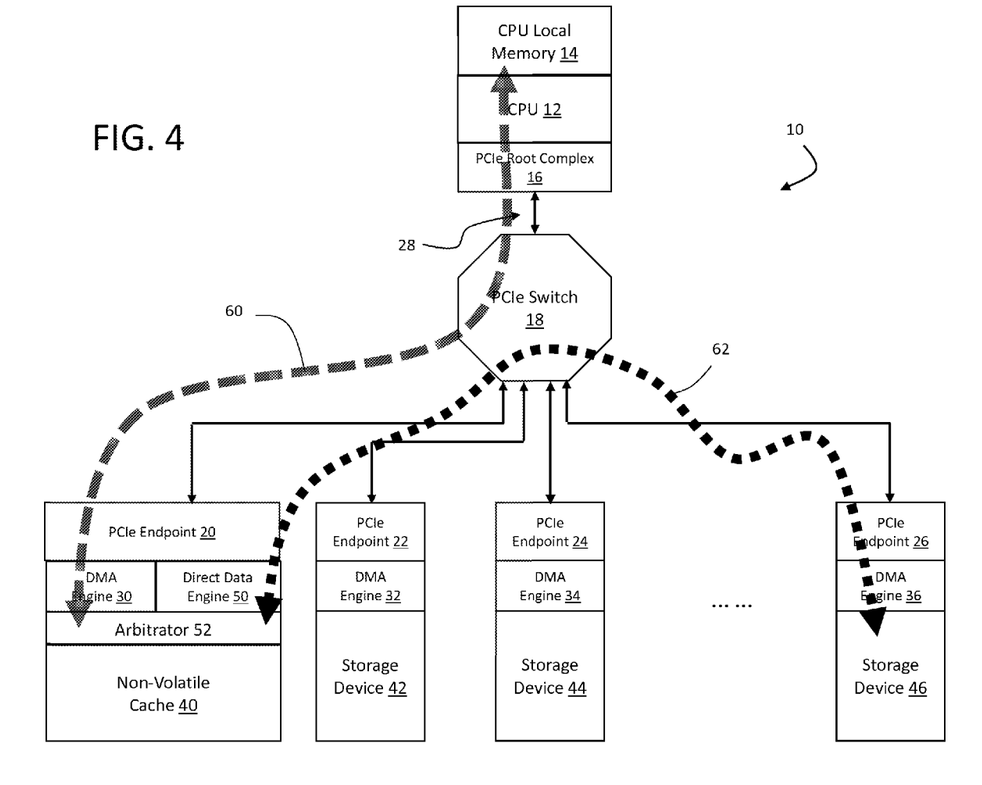
FIG. 4 is a block diagram illustrating data flows between CPU, memory, non-volatile cache with direct access support, and storage devices in a computer system according to embodiments of the present invention.

To address this problem, the present approach provides a direct access mode implemented and controlled at the non-volatile cache endpoint 20 that allows data to be directly read/written between the non-volatile cache 40 and a storage device 42, 44, 46 via PCIe switch 18. FIG. 3 depicts an illustrative system for providing a non-volatile cache 40 with a direct access mode. In this embodiment, a direct data engine 50 is implemented along with the DMA engine 30. The direct data engine 50 is configured to implement direct PCIe data read/write actions with other storage devices 42, 44, 46. This is illustrated in FIG. 4 with path 62 that allows data to be read/written between a selected storage device 46 and non-volatile cache 40. Direct data engine 50 includes a specialized processor that allows the PCIe endpoint 20 to issue commands (similar to those issued by CPU 12) to the PCIe switch 18 and PCIe endpoint 26 that will read/write data directly between the non-volatile cache 40 and selected storage device 46. Thus, the non-volatile cache is able to, e.g., read data from a storage device 42, 44, 46 without the data passing through the CPU local memory 14. An arbitrator 52 arbitrates the operations between the traffic on both traditional DMA CPU access requests and direct access requests.

Figure 5:
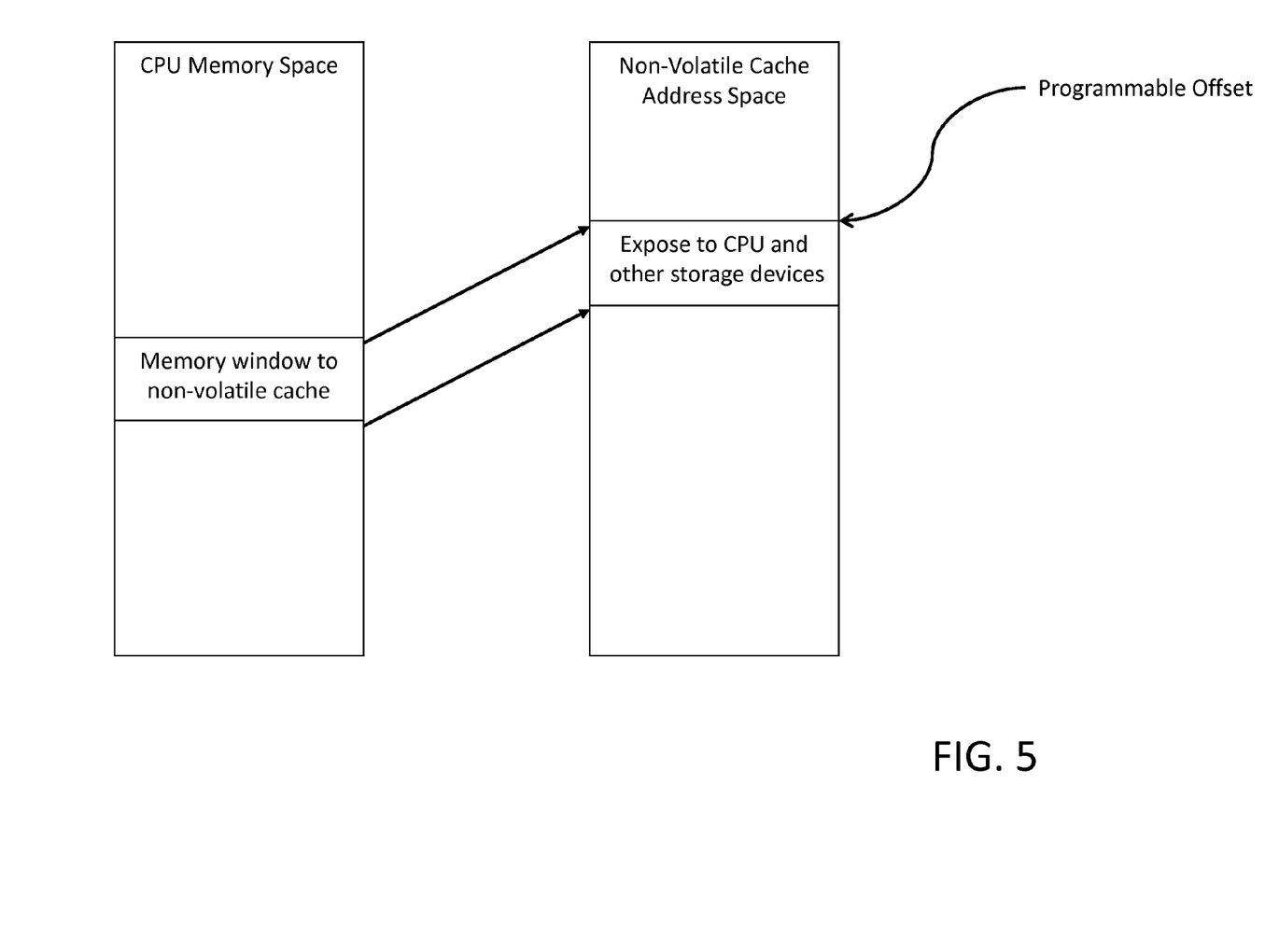
FIG. 5 is a block diagram illustrating a method for mapping non-volatile cache address to system memory address according to embodiments of the present invention.

FIG. 5 depicts how the address of non-volatile cache 40 is mapped to the system memory address of the CPU local memory 14 with a programmable offset. With the programmable address offset, any portion of the non-volatile cache 40 is accessible to other storage devices 42, 44, 46 in the system 10.

In the case of DMA initiated requests involving non-volatile cache 20 from another storage device 42, 44, 46, the PCIe switch 18 directs the requests to the non-volatile cache instead of CPU PCIe root complex 16. The CPU local memory 14 is not involved in the data transmission. Instead, the direct data engine 50 in the non-volatile cache controller configures the PCIe switch 18 for a direct access mode.

Figure 6:
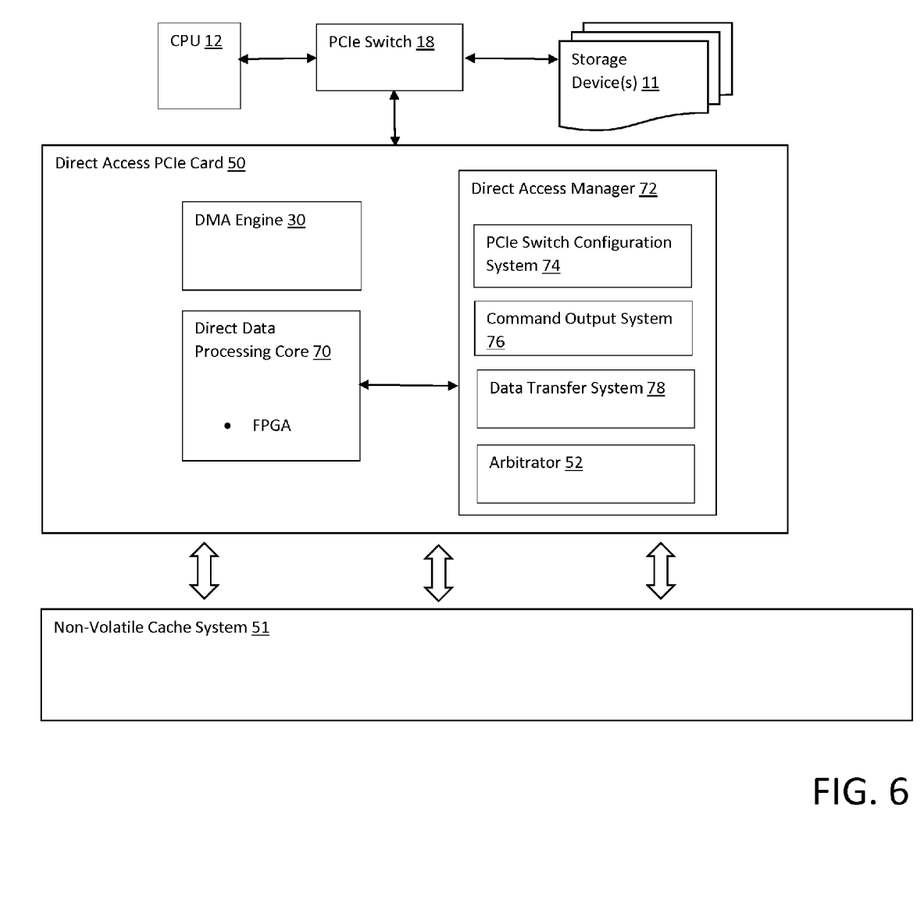
FIG. 6 depicts a direct data PCIe system according to embodiments of the present invention.

FIG. 6 depicts an illustrative embodiment of a direct access PCIe card 50 that is adapted to plug into or otherwise connect to a non-volatile cache system 52. Non-volatile cache system 51 generally includes some type of electronically addressable semiconductor memory such as RAM, Flash Memory, etc. Conversely, storage device(s) 11 generally comprises some type of slower data storage such as magnetic or optical media. As described herein, direct access PCIe card 50 includes all of the features of a traditional PCIe card (i.e., endpoint) such as DMA engine 30, but also includes an infrastructure for transferring data directly to and from a storage device 11.

In addition to standard PCIe end-point components, direct access PCIe card 50 implements a direct data engine that includes: (1) a direct access processing core 70, which may for example be implemented using FPGA (field programmable gate array) technology, ASIC technology, or any other known system; and a direct access manager 72. Direct access manager 72 may for example comprises a memory storage area that stores programming logic modules for controlling the direct access processing core 70. In other embodiments, some or all of direct access manager 72 may be implemented in hardware or a combination of software and hardware.

In this illustrative embodiment, direct access manager 72 includes: (1) a PCIe switch configuration system 74 for configuring the PCIe switch 18 to utilize traditional read/write operations via CPU 12 (i.e., CPU access mode), or utilize direct access operations with a selected storage device 11 (direct access mode); (2) a command output system 76 for generating or otherwise processing read/write commands to/from a storage device 11; and (3) a data transfer system 78 for managing the direct access data flows between the non-volatile cache system 51 and a selected storage device 11. In this embodiment, arbitrator 52 is also implemented in software and includes logic to schedule the traffic flows through PCIe switch 18 to and from non-volatile cache system 52.

Figure 7:
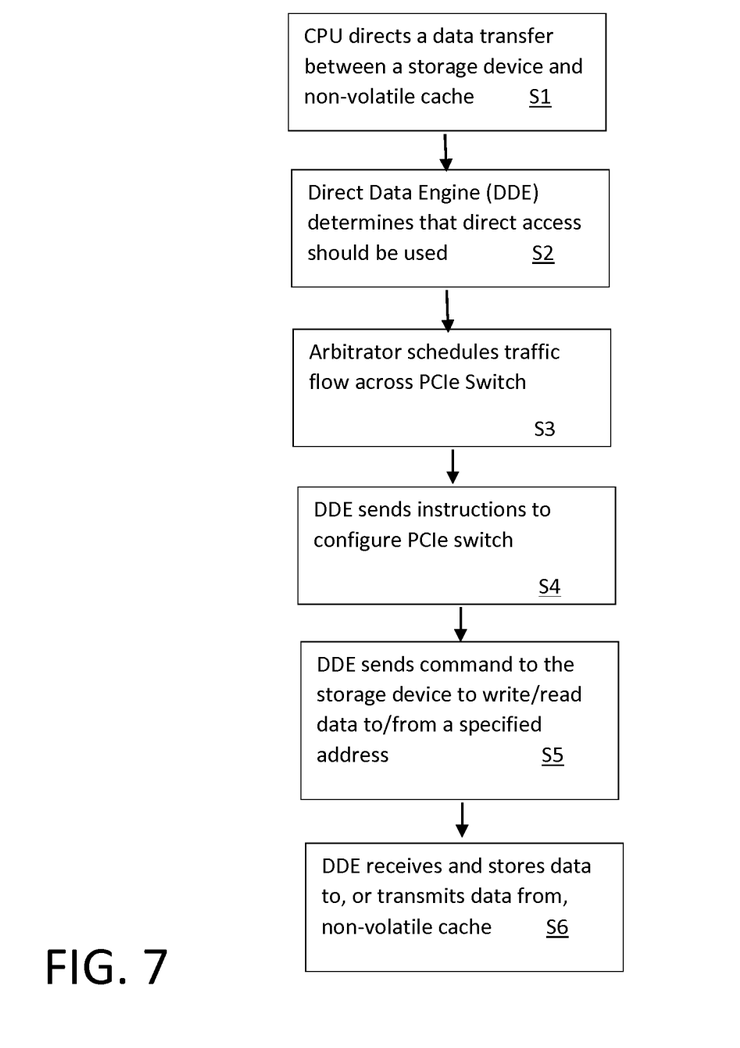
FIG. 7 depicts a flow diagram of a method of providing direct data access according to embodiments of the present invention.

FIG. 7 depicts a flow diagram of an illustrative method for implementing direct access. At S1, CPU 12 directs a data transfer between a storage device 11 and non-volatile cache 40. This may involve a data transfer into or out of the non-volatile cache 40. At S2, the direct data engine (DDE) 50 determines that direct access should be used and at S3 the arbitrator schedules traffic flow across the PCIe switch 18. At S4, once direct access is scheduled and ready, DDE 50 sends instructions to configure the PCIe switch 18 for direct access and at S5, DDE 50 sends a command to the storage device 11 to write/read data to/from a specified address. Finally, at S6, DDE 50 directly receives and stores data to, or transmits data from, non-volatile cache 40.

Note that the proposed system and method of direct non-volatile cache access across devices is fully scalable. More than one PCIe switch along with storage devices can be connected as the number of storage devices increase. Additional non-volatile caches can be added if more high speed cache is required.

Note also that while generally directed to a PCIe architecture, this approach could be used with other protocols, such as Infiniband. In one illustrative embodiment, either the non-volatile cache 40 or the storage devices 11 in question may use other bus protocols and be attached to a PCIe switch 18 through a PCIe bridge. In such a PCIe system, the DMA engines 50 in the storage devices 11 can still go through the local bus, PCIe bridge, and PCIe switch to the non-volatile cache, without departing from the spirit and scope of the present disclosure.

The method and system in accordance with an embodiment of the present disclosure is applicable to various types of storage devices without departing from the spirit and scope of the present disclosure. It is also contemplated that the term storage devices 11 may refer to either logical and/or physical storage devices, and the term CPU may refer to various devices capable of sending read/write commands to the switch and storage devices. It is understood that such devices may be referred to as processors, hosts, initiators, requesters or the like, without departing from the spirit and scope of the present disclosure.

It is to be understood that the present disclosure may be conveniently implemented in forms of a software package. Such a software package may be a computer program product that employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions, via hardware or a combination thereof.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing direct data access between a non-volatile cache and a set of storage devices in a computing system that utilizes a PCI Express (PCIe) infrastructure, comprising:
   a processing core embedded in a controller card that controls a non-volatile cache system; and
   a direct access manager for directing the processing core, wherein the direct access manager includes:

a switch configuration system that includes logic to control a PCIe switch for either a direct access mode or a CPU access mode, wherein the PCIe switch couples each of the storage devices, a local bus, and the non-volatile cache system, and wherein each storage device and the non-volatile cache system includes a PCIe endpoint and a direct memory access (DMA) engine;

a command processing system that includes logic to process data transfer commands; and a data transfer system that includes logic to manage the flow of data directly between the non-volatile cache and the set of storage devices.

2. The system of claim 1, wherein the controller card comprises a PCIe controller card.

3. The system of claim 1, wherein the processing core comprises a field programmable gate array (FPGA) device.

4. The system of claim 1, wherein the computing system includes a CPU, CPU local memory and a PCIe root complex, and wherein the direct access manager further comprises an arbitrator that arbitrates data traffic flow through the switch.

5. The system of claim 4, wherein the controller card includes a direct memory access (DMA) engine for transferring data between the non-volatile cache and the CPU local memory in the CPU access mode.

6. The system of claim 1, wherein the set of storage devices utilize at least one of an optical and magnetic storage media.

7. The system of claim 1, wherein the non-volatile cache comprises non-volatile RAM (random access memory).

8. A computing system, comprising:
a CPU having a local memory and PCIe root complex;
a bus that couples the CPU to a PCIe switch;
a set of storage devices and a non-volatile cache coupled to the PCIe switch;
a direct access PCIe controller card coupled to the non-volatile cache that provides direct data access between the non-volatile cache and the set of storage devices, wherein the direct access PCIe controller card includes:
a processing core;
a direct access manager for controlling the processing core, wherein the direct access manager includes:
a switch configuration system that includes logic to control the PCIe switch between a direct access mode and a CPU access mode;
a command output system that includes logic to output data transfer commands; and
a data transfer system that includes logic to manage the flow of data directly between the non-volatile cache and the set of storage devices; and
an arbitrator that schedules data traffic flow through the PCIe switch.

9. The computing system of claim 8, wherein the processing core comprises a field programmable gate array (FPGA) device.

10. The computing system of claim 8, wherein the direct access PCIe controller card includes a direct memory access (DMA) engine for transferring data between the non-volatile cache and the local memory.

11. The computing system of claim 8, wherein the set of storage devices utilize at least one of an optical and magnetic storage media.

12. The computing system of claim 8, wherein the non-volatile cache comprises non-volatile RAM (random access memory).

13. A method of providing direct data access between a non-volatile cache system and a set of storage devices in a computing system, wherein the computing system further includes a CPU, CPU local memory, a root complex and a switch, and wherein the computing system utilizes a point-to-point topology in which separate serial links connect the root complex with the non-volatile cache system and a set of storage devices, the method comprising:

providing a controller that is coupled to and controls a non-volatile cache system, wherein the non-volatile cache includes an endpoint and a direct memory access engine for serially transferring data with the root complex;

receiving at the controller a command from the CPU to transfer data between the non-volatile cache system and a storage device;

generating and sending a command from the controller to configure the switch to allow a direct data transfer between the non-volatile cache system and the storage device;

generating and sending a data transfer command from the controller to the storage device; and implementing the data transfer directly through the switch between the non-volatile cache system and the storage device.

14. The method of claim 13, wherein the computing system utilizes a PCIe infrastructure and the controller includes a PCIe controller card.

15. The method of claim 13, wherein the wherein the controller card includes a processing core implemented with a field programmable gate array (FPGA) device.

16. The method of claim 15, wherein the controller card includes a direct memory access (DMA) engine for transferring data between the non-volatile cache system and the CPU local memory.

17. The method of claim 13, wherein the set of storage devices utilize at least one of an optical and magnetic storage media.

18. The method of claim 13, wherein the non-volatile cache system comprises non-volatile RAM (random access memory).

19. The method of claim 13, further comprising utilizing the controller to arbitrate traffic flow on the switch.

* * * * *